May 28, 1963 O. C. NIEDERER, JR., ETAL 3,091,323
EGG HANDLING EQUIPMENT
Filed March 9, 1961
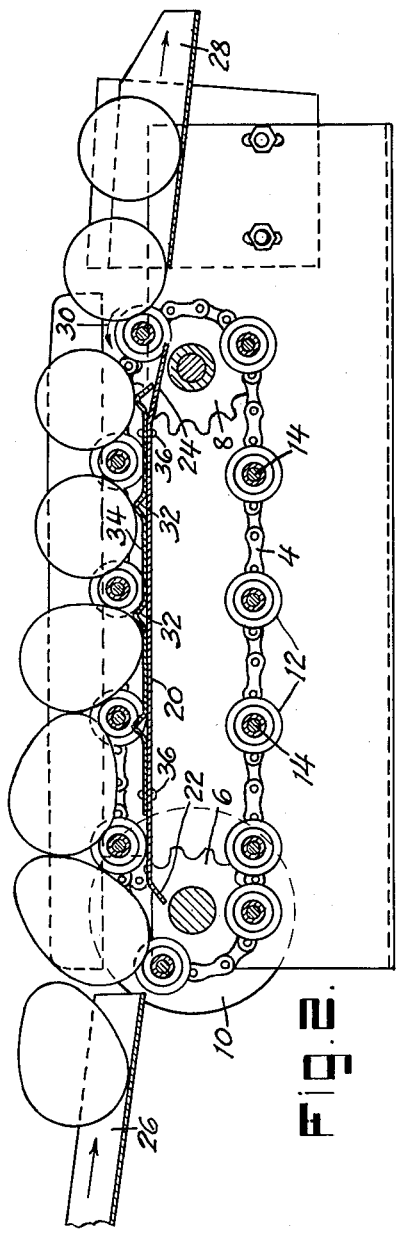
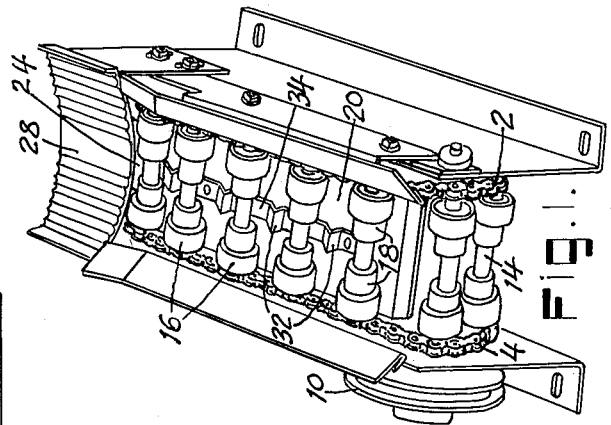
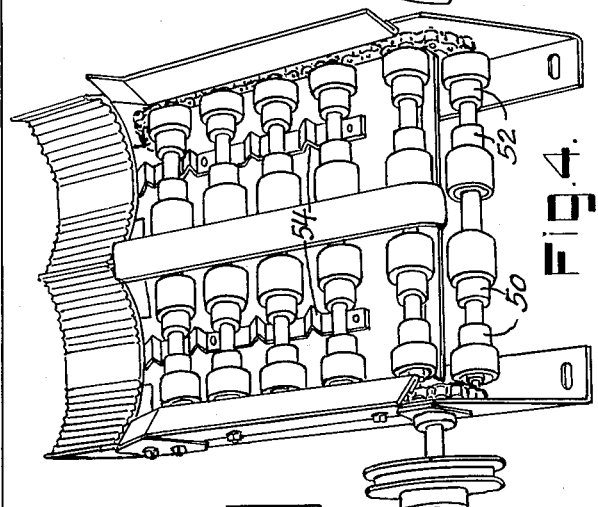
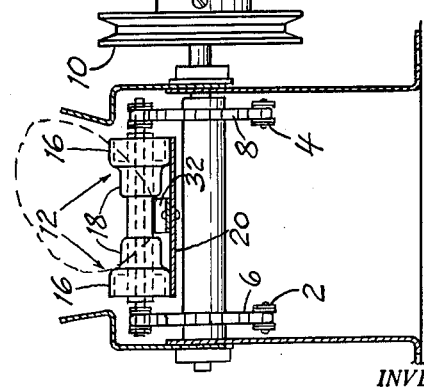
INVENTORS
OTTO C. NIEDERER, JR.
BY HERBERT O. NIEDERER
Albert Sperry.
ATTORNEY

United States Patent Office 3,091,323
Patented May 28, 1963

3,091,323
EGG HANDLING EQUIPMENT
Otto C. Niederer, Jr., Bear Tavern Road, and Herbert O. Niederer, Church Road, both of Titusville, N.J.
Filed Mar. 9, 1961, Ser. No. 94,615
5 Claims. (Cl. 198—33)

This invention relates to egg handling equipment and is directed particularly to egg conveying means which serve to assure the positioning of eggs in predetermined spaced relation and with their long axes parallel upon discharge of the eggs from the conveying means.

It is frequently necessary to arrange eggs in predetermined spaced relation with their axes parallel in feeding the eggs to or removing eggs from a grader, candler or other equipment. However, the eggs are often supplied to the conveying means from a washer or other source in an irregular manner and with their axes extending lengthwise or in other directions with respect to the conveying means.

In accordance with the present invention, a novel type of conveying means is provided by which the eggs are raised or otherwise moved while they are in engagement with elements of the conveyor so as to shift the eggs into positions wherein their axes will be parallel and they will be properly spaced as they are discharged from the conveying means.

In the preferred embodiment of the invention herein shown and described, the conveying means includes a plurality of spaced supports or rollers which receive and hold the eggs and which travel over one or more egg lifting members that project upwardly toward the rollers. The eggs are thus tilted with respect to the rollers and the downwardly projecting portion of the eggs may be somewhat retarded when they engage the lifting members. At the same time the end or portion of the egg which still rests on the roller or supports of the conveyor continue to advance. As a result, those eggs which are not properly positioned are turned or displaced with respect to the rollers until they are brought into a position wherein their long axes are parallel and extend transversely to the direction of movement of the conveyor. All eggs are thus discharged from the conveying means in spaced relation and with their axes parallel.

Accordingly, the principal object of the invention is to provide a novel type of conveying means for eggs which serves to assure discharge of the eggs from the conveying means in spaced relation and with their long axes parallel.

Another object of the invention is to provide an egg conveyor with means which engage and move the eggs relative to the conveyor so as to assure the desired arrangement of the eggs thereon.

A specific object of the invention is to provide egg conveying means wherein a conveyor having spaced egg supports is movable over one or more egg lifting members which serve to lift and retard the downwardly projecting portion of an egg to turn or rearrange the egg on the egg conveying means as it advances.

These and other objects and features of the present invention will appear from the following description thereof wherein reference is made to the figures of the accompanying drawing.

In the drawing:

FIG. 1 is a perspective illustrating a typical form of egg conveying means embodying the present invention;

FIG. 2 is a longitudinal sectional view of the egg conveying means of FIG. 1;

FIG. 3 is a transverse sectional view through the egg conveying means of FIG. 1; and FIG. 4 illustrates an alternative form of the invention embodying parallel egg conveying means.

In that form of the invention chosen for purposes of illustration in the drawing, the conveying means embodies a pair of spaced parallel chains, belts or other continuous members indicated at 2 and 4 which pass about the sprockets 6 and 8. The sprocket 8 is driven by a pulley 10 or other driving means from a suitable source to cause the upper run of the chains to travel toward the lift as seen in FIG. 2.

The eggs to be conveyed are supported by supporting elements which, as shown, are in the form of flexible rubber or plastic rollers 12 which are spaced apart lengthwise of the chain a distance sufficient to permit a portion of each egg to project downwardly between the rollers by which it is carried. For this purpose, the rollers 12 are mounted on rods 14 which extend from the chain 2 to the chain 4 in parallel relation and transversely to the direction of movement of the conveyor. The rollers themselves are preferably formed with outer end portions 16 of larger diameter and which may be of tubular form so as to afford a resilient support for the eggs. The central portions 18 of the rollers are of smaller diameter and are positioned nearer the central portion of the conveyor to accommodate the larger mid-portions of the eggs.

Beneath the upper run of the conveyor there is a plate 20 which has a downwardly curving end portion 22 at the receiving end of the conveying means and a downwardly curved end portion 24 at the discharge end of the conveying means. A feed channel 26 directs eggs to the conveying means adjacent the downwardly curving end portion 22 of the plate 20 whereas discharge channel 28 is positioned adjacent the downwardly curved end portion 24 to receive eggs discharged from the conveying means.

The positions of the plate 20 and of the chains 2 and 4 are such that the larger outer end portions 16 of the rollers will engage and ride up the curving end portion 22 of the plate and will remain in engagement with the flat central portion of the plate 20 to cause the rollers to rotate as they move along the upper surface of the plate when the chains are advanced. The downwardly curving end 24 of the plate 20 adjacent the discharge channel 28 is relatively narrow so that the end portions 16 of the rollers are disengaged from the plate 20. The rollers are, therefore, free to turn backward or to rotate in the direction of the arrow 30 adjacent the discharge end of the conveying means when the egg rolls forward onto the discharge channel 28.

The plate 20 has centrally located lifting members 32 which project upward toward the rollers near the mid-portion thereof. These members may be formed in various ways but, as shown, a strip of material 34 may be secured to the upper surface of the plate 20 by means of rivets 36 or other fastening means and the strip may be formed with spaced upwardly extending bends to serve as the egg lifting members 32.

In using the construction thus provided, the eggs are fed to the conveying means along the egg feeding channel 26 into position to be engaged and picked up by the rollers 12 so that they will be advanced over the plate 20. The rollers or supporting members 12 carried by the chains are spaced apart a distance sufficient to permit the lowermost portion of the egg to project downward below the central portion of the roller or supporting members and into position to be engaged by the egg lifting members 32. Therefore, as the eggs are advanced over the plate 20, they are turned by the rollers 12 which are rotated by reason of their engagement with the plate 20. Upon reaching the egg lifting members 32, the eggs are lifted slightly and one end or the lighter portion of the egg is raised from the larger portion 16 of the roller which it engages. The egg will then be momentarily supported by the egg lifting member 32 and by the forwardly moving upper portion 16 at one end of the rollers 12 as shown in dotted lines in FIG. 3. In this way, one end of the egg will be caused to move forward by the rollers while the central portion of the egg will be retarded. As a result, the egg will be caused to turn slightly with respect to the conveying means. After passing the lifting member 32, the egg will settle back so that both ends of the egg engage the rollers 12. The egg will then assume a position in which its long axis extends parallel to the rollers and transverse to the direction of movement of the conveying means.

Those eggs which are already positioned with their axes parallel with the rollers are not turned or shifted sufficiently to alter their position material and, therefore, return to their transverse positions parallel to the rollers as soon as they pass a lifting member 32. However, those eggs which have their long axes extending at a substantial angle to the rollers or in a direction parallel to the direction of movement of the conveying means are turned sufficiently to cause them to extend parallel to the roller.

The angle through which an egg is turned in passing over one of the retarding members 32 will depend somewhat upon the position and size of the egg. Thus, the angle of turning is at times relatively small and, therefore, it is generally preferable to provide several of the lifting members at spaced points along the path of travel of the conveying means. In practice, it is found that when from three to six of the lifting members are employed, all of the eggs received from the feed channel 26 will be turned sufficiently to assure the parallel and transverse positioning of all of the eggs as they are delivered to the discharge channel 28 from the conveying means. It is also found that this result can be attained in a relatively short distance of travel so that the conveying means may be relatively short, say 12 inches or so. Therefore, the conveying means can be used conveniently between existing types of egg handling equipment and may be driven therefrom to coordinate the operation of the conveying means with other equipment.

As shown in FIG. 4, the conveying means may be provided with multiple sets of rollers or egg supporting means indicated at 50 and 52 for receiving and delivering eggs from and to multiple feed and discharge channels. Egg lifting means 54 may then be associated with each set of rollers and each channel of the conveying means. The construction, therefore, is adapted for use with equipment handling large numbers of eggs.

The shape and type of the rollers or egg supporting means employed and the type of chain, belt or other continuous means used in the assembly may, of course, be varied considerably and, if desired, the lifting members may be movable and take the form of cams or eccentric members actuated in timed relation to the movement of the chain or belt.

In view thereof, it should be understood that the particular embodiments of the invention shown in the drawing and described above are intended to be illustrative only and are not intended to limit the scope of the invention.

We claim:
1. Egg handling means comprising egg conveying means embodying a pair of longitudinally extending members which are arranged in parallel relation, rotatable elements located adjacent the opposite ends of the conveying means about which said longtudinally extending members pass, means for driving at least one of said rotatable elements to move the conveyor longitudinally, rollers supported by the longitudinally extending members and having their axes extending in parallel relation transversely of the direction of movement of the conveying means, said rollers being spaced apart a distance sufficient to permit eggs supported on the rollers in the upper run of the conveying means to project downward below the middle portions of said rollers, and egg lifting means located at a plurality of longitudinally spaced points beneath the middle portions of said rollers and between the rotatable elements about which the longitudinally extending members of the conveying means pass, said egg lifting means being constructed and arranged to engage the downwardly extending portions of eggs supported on said rollers in the upper run of the conveying means to cause the eggs to shift their positions with respect to said rollers while the eggs are supported on the rollers and assume positions in which their long axes are substantially parallel to the axes of the rollers.

2. Egg handling means as defined in claim 1 wherein means are provided for rotating said rollers as they are advanced by said chains.

3. Egg handling means comprsing a pair of chains arranged in parallel relation, sprockets about which said chains pass, one of said sprockets being driven to move said chains in a predetermined direction and at the same speed, rollers supported by said chains and extending in parallel relation transverse to the direction of movement of the chains, the ends of said rollers benig of larger diameter than the middle portions of the rollers, a plate positioned beneath the rollers and engaged by the larger portions of said rollers so that the rollers are caused to rotate as they are advanced by said chains, said rollers being spaced apart a distance sufficient to permit eggs supported thereby to project downwardly between the middle portions of the rollers, egg lifting means carried by said plate and located beneath the middle portions of said rollers in position to engage the downwardly projecting portions of eggs supported by the rollers, and means for supplying eggs to said rollers.

4. Egg handling means as defined in claim 3 wherein a plurality of said egg lifting means are arranged in spaced relation parallel to the direction of movement of said rollers.

5. Egg handling means as defined in claim 3 wherein a plurality of sets of said rollers are arranged to present a plurality of parallel channels for the handling of multiple rows of eggs.

References Cited in the file of this patent
UNITED STATES PATENTS

| | | |
|---|---|---|
| 2,212,892 | Ashlock | Aug. 27, 1940 |
| 2,895,589 | Rostron | July 21, 1959 |
| 2,961,087 | Reading | Nov. 22, 1960 |
| 2,987,991 | Johnson | June 13, 1961 |